Jan. 5, 1960 M. P. SIEDBAND 2,920,265
R.M.S. VOLTAGE REGULATOR
Filed Dec. 14, 1956

INVENTOR
MELVIN P. SIEDBAND

BY

ATTORNEYS

United States Patent Office 2,920,265
Patented Jan. 5, 1960

2,920,265
R.M.S. VOLTAGE REGULATOR

Melvin P. Siedband, Baltimore, Md., assignor, by mesne assignments, to the United States of America as represented by the Secretary of the Navy Application December 14, 1956, Serial No. 628,469

5 Claims. (Cl. 323—75)

The present invention relates to a voltage regulator and more particularly to a voltage regulator particularly adapted for aircraft use.

Prior art voltage regulating circuits because of their weight, complexity, and fragility are not suitable for use in aircraft electrical systems. The voltage regulator of the present invention which embodies a novel error detector overcomes the disadvantages of the prior art by the provisions of a circuit of sturdy construction in which the weight and number of parts are reduced to a minimum.

Accordingly it is an object of the present invention to provide a voltage regulator of sturdy construction and of minimum weight and complexity.

It is another object of the present invention to provide a voltage regulator of the character described embodying a novel error detector circuit.

It is still a further object of the present invention to provide a new and improved error detector circuit.

Other objects and many of the attendant advantages of this invention will be readily appreciated as the same becomes better understood by reference to the following detailed description when considered in connection with the accompanying drawings wherein.

Figure 1:
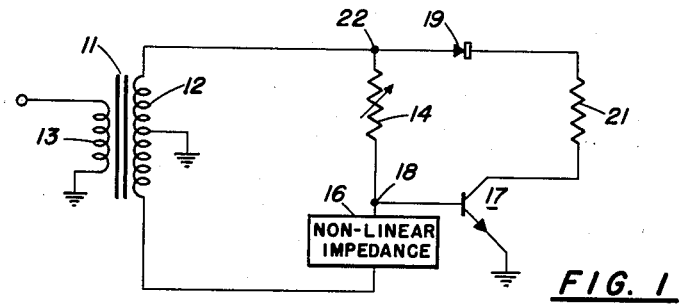
Fig. 1 is a schematic circuit diagram of an illustrative embodiment of the error detector of the present invention.

Referring now to Fig. 1 there is shown a transformer 11 having a secondary winding 12 with a grounded center tap and a primary winding 13 having one terminal grounded and the other terminal thereof connected to an alternating current source (not shown). A variable resistor 14, such as a potentiometer, and a non-linear impedance 16 are connected in series across secondary winding 12. The base of a transistor 17 is connected to the junction 18 between the resistor 14 and impedance 16. A rectifier 19, a load (represented by resistor 21), and the collector and emitter of transistor 17 are connected in series between terminal 22 of resistor 14 and ground. Secondary winding 12, variable resistor 14, and non-linear impedance 16 form a Wheatstone bridge with the base-emitter circuit of transistor 17 being connected between the balance points thereof.

Figure 2:
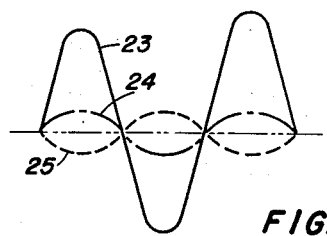
Fig. 2 illustrates certain wave forms occurring in the embodiment of Fig. 1.

Referring to Fig. 2, wave form 23 represents the detector input voltage appearing across secondary winding 12. Waveforms 24, 25 represent the voltages appearing in secondary winding 12 between the output terminals thereof and ground. If the resistance of impedance 16 is higher than the resistance of resistor 14, the voltage applied to the base of transistor 17 (wave form 24) will be in phase with the input voltage 23 supplied to the collector thereof and conduction of current through the load 21 will be permitted during the positive half cycles of the input voltage, rectifier 19 preventing conduction during the alternate half cycles. If, however, the resistance of impedance 16 is lower than the resistance of resistor 14, the voltage applied to the base of transistor 17 (wave form 25) will be out of phase with the voltage supplied to the collector thereof and no conduction will be permitted during either half cycle of the input voltage.

The circuit described may be employed as an error detector in many applications. For example, non-linear impedance 16 may be a temperature responsive resistor and load 21 the operating winding of a relay to thus provide a simple and reliable thermostatic control circuit. For further example, non-linear impedance 16 may be a strain sensitive resistor and load 21 a meter to thus provide a simple and reliable strain gage circuit.

Figure 3:
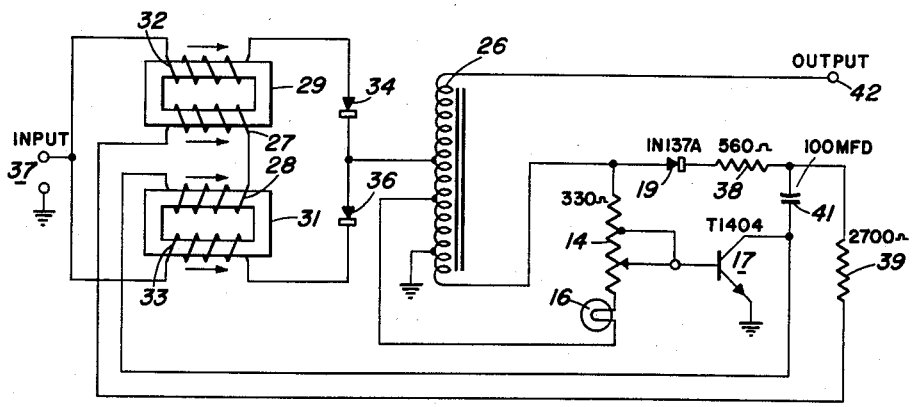
Fig. 3 illustrates a voltage regulating circuit embodying the error detector of Fig. 1.

A voltage regulator embodying the error detector of Fig. 1 is shown in Fig. 3. In this application, if desired, an auto transformer 26 may be substituted for the transformer 11, non-linear impedance 16 may be a voltage responsive resistor, for example, the filament of an incandescant lamp, and the load may comprise the control windings 27, 28 of a pair of saturable reactors 29, 31, the load windings 32, 33 of which are respectively connected through rectifiers 34, 36 between an alternating voltage source, applied to input terminals 37, and auto transformer 26. The circuit of Fig. 3 further includes a pair of current limiting resistors 38, 39, a smoothing capacitor 41 and an output terminal 42. Illustrative values of the error detector circuit impedances and illustrative rectifier and transistor types are shown in Fig. 3.

The mode of operation of the voltage regulating circuit of Fig. 3 is as follows: Assume the input voltage applied to terminal 37 has a magnitude in excess of a selected maximum (determined by the wiper setting of potentiometer 14). The resistance of non-linear impedance 16 will be higher than the resistance of resistor 14. On the positive half cycle of the input voltage wave the voltage appearing at the base of transistor 17 will then be in phase with the voltage applied to the collector thereof. Current conduction will then be permitted through rectifier 19, resistors 38, 39, control windings 27, 28 and transistor 17 to ground. The windings of reactor 29, 31 are arranged in such a manner that current flow in control windings 27, 28 in the direction permitted by rectifier 19 will oppose the saturating flux generated by load windings 32 and 33 to thus present a higher impedance between the input voltage and auto transformer 26 thereby reducing the voltage applied to output terminal 42.

The circuit of Fig. 3 is capable of maintaining the voltage output to terminal 42 at 115 volts ±1 volt with a line voltage variation from 100 to 130 volts A.C., a frequency variation from 350 to 450 cycles per second, a temperature variations from −55 degrees to +100 degrees centigrade and extremes of vibrations. In contrast to prior art regulations which may weigh 25 pounds for 250 watts output, the regulating system of Fig. 3 may weigh only 7 pounds for 750 watts output.

Obviously many modifications and variations of the present invention are possible in the light of the above teachings. It is therefore to be understood that within the scope of the appended claims the invention may be practiced otherwise than as specifically described.

What is claimed is:

1. A voltage regulator comprising: input terminal means adapted to be connected to a source of alternating potential, output terminal means adapted to be connected to a load, voltage regulating means, circuit means including said voltage regulating means connecting said input terminal means to said output terminal means, a transistor, a variable resistor, a voltage dependent impedance, a circuit means to couple said resistor and said impedance to be energized in series by said source of alternating potential, circuit means connecting the base of said transistor to the common terminal of said resistor and said impedance, and circuit means including said voltage regulating means and a rectifier for coupling the collector and emitter of said transistor to be energized in series by said source of alternating potential.

2. A voltage regulator comprising: input terminal means adapted to be connected to a source of alternating potential, output terminal means adapted to be connected to a load, variable impedance means having direct current responsive means operative to vary the impedance of said variable impedance means, circuit means including said variable impedance means connecting said input terminal means to said output terminal means, a transistor, a variable resistor, a voltage responsive impedance, circuit means to couple said resistor and said voltage responsive impedance to be energized in series by said source of alternating potential, circuit means connecting the base of said transistor to the common terminal of said resistor and said impedance, and circuit means including said direct current responsive means and a rectifier for coupling the collector and emitter of said transistor to be energized in series by said source of potential.

3. A voltage regulator comprising: input terminal means adapted to be connected to an alternating voltage source, output terminals adapted to be connected to a load, a saturable reactor means having a load winding means and a control winding means, circuit means including said load winding means connecting said input terminal means to said output terminal means, a transistor, a variable resistor, a voltage dependent impedance, circuit means to couple said resistor and said impedance to be energized in series by said alternating voltage source, circuit means connecting the base of said transistor to the common terminal of said resistor and said impedance, and circuit means including a rectifier and said control winding means for coupling the collector and emitter of said transistor to be energized in series by said alternating voltage source.

4. A voltage regulator comprising: input terminal means adapted to be connected to an alternating voltage source, output terminal means adapted to be connected to a load, a pair of saturable core reactors each having a load winding and a control winding, circuit means including said load windings connecting said input terminal means to said output terminal means, a transistor, a variable resistor, a voltage dependent impedance, circuit means to couple said resistor and said impedance to be energized in series by said alternating voltage source, circuit means connecting the base of said transistor to the common terminal of said resistor and said impedance, a rectifier, and circuit means for coupling the collector and emitter of said transistor said rectifier and said control windings to be energized in series by said alternating voltage source.

5. An error detector comprising: a transistor, a variable resistor, a condition responsive impedance, circuit means to couple said resistor and said impedance to be energized in series by a source of alternating potential, circuit means connecting the base of said transistor to the common terminal of said resistor and said impedance, and circuit means including a load an da rectifier for coupling the collector and emitter of said transistor to be energized in series by said source of alternating potential, whereby the load current will vary in accordance with variation in said condition.

References Cited in the file of this patent

UNITED STATES PATENTS

| | | |
|---|---|---|
| 2,607,827 | Mennie | Aug. 19, 1952 |
| 2,751,545 | Chase | June 19, 1956 |
| 2,838,643 | Elliot et al. | June 10, 1958 |